United States Patent
Kim et al.

(10) Patent No.: US 7,396,502 B2
(45) Date of Patent: Jul. 8, 2008

(54) METHOD OF PRODUCING NANO-SIZED FE POWDER HAVING POLYMER COATED LAYER

(75) Inventors: Byung Kee Kim, Busan-shi (KR); Dong Won Lee, Changwon-shi (KR); Chul-Jin Choi, Changwon-shi (KR)

(73) Assignee: Korea Institute of Machinery and Materials, Daejon (KR)

( * ) Notice: Subject to any disclaimer, the term of this patent is extended or adjusted under 35 U.S.C. 154(b) by 555 days.

(21) Appl. No.: 10/980,940

(22) Filed: Nov. 3, 2004

(65) Prior Publication Data
US 2005/0150329 A1    Jul. 14, 2005

(30) Foreign Application Priority Data
Nov. 5, 2003    (KR) .................. 10-2003-0077822

(51) Int. Cl.
*B22F 9/24* (2006.01)
(52) U.S. Cl. ...................... 266/120; 266/202
(58) Field of Classification Search ................. 266/120, 266/202
See application file for complete search history.

(56) References Cited

U.S. PATENT DOCUMENTS

| | | | |
|---|---|---|---|
| 5,766,306 | A | 6/1998 | Olli et al. |
| 6,033,624 | A | 3/2000 | Gonsalves et al. |
| 7,186,398 | B2 * | 3/2007 | Andres et al. ................. 424/9.1 |
| 2005/0109159 | A1 | 5/2005 | Kim et al. |

FOREIGN PATENT DOCUMENTS

KR    20050042929    5/2005

OTHER PUBLICATIONS

Choi, C.J. et al., "Characterization of Fe and Co Nanoparticles Synthesized by Chemical Vapor Condensation", Scripta Materialia, vol. 44, pp. 2225-2229, May 18, 2001.*
Dong, X.L. et al., "Structural and Magnetic Characterization of Fe Nanoparticles Synthesized by Chemical Vapor COndensation Process", Journal of Applied Physics, vol. 92, No. 9, pp. 5380-5385, Nov. 1, 2002.*
Wang Z.H, et al. "Microstructure and magnetic property of Fe-Co nanoparticles prepared by chemical vapor condensation process", Journal of Alloys and Compounds, vol. 351, No. 1, Mar. 10, 2003, pp. 319-323(5).

(Continued)

*Primary Examiner*—George Wyszomierski
(74) *Attorney, Agent, or Firm*—Lathrop & Gage LC

(57) ABSTRACT

The present invention provides a method for producing nano-sized Fe powder having a polymer coated layer on a surface thereof, so as to prevent the nano-sized Fe powder from being oxidized under atmosphere. The method includes: gasifying an iron pentacarbonyl ($Fe(CO)_5$) or an iron acetate (($CH_3CO_2)_2Fe$) precursor in a ceramic bubbler; forming nano-sized Fe particles due to the crystallization of Fe gas while mixing the gasified precursor with Ar gas in a reactor; and precipitating the nano-sized Fe particles in a polymer solution in a chamber, before the nano-sized Fe particles are oxidized. According to this technique, Fe powder on the order of tens of nms in size, and having a polymer coated layer, are obtained from the Fe precursor. A system for producing the nano-sized Fe powder is also disclosed.

13 Claims, 5 Drawing Sheets

OTHER PUBLICATIONS

U.S. Appl. No. 10/974,125; Office Action Mailed Jul. 31, 2007.
U.S. Appl. No. 10/974,125; Notice of Abandonment Mailed Feb. 25, 2008.

Korean Application No. KR10-2003-0077589, Korea Institute of Machinery and Materials, Nov. 4, 2003.

* cited by examiner

METHOD OF PRODUCING NANO-SIZED FE POWDER HAVING POLYMER COATED LAYER

RELATED APPLICATION

This application claims priority to Korean Patent Application Serial Number 10-2003-0077822, filed Nov. 5, 2003 the disclosure of which is herein incorporated by reference.

BACKGROUND OF THE INVENTION

1. Field of the Invention

The present invention relates to a system and method for producing nano-sized Fe powder, and in particular, to a system and method for producing nano-sized Fe powder having a polymer coated layer so as to prevent the powder from being oxidized under atmosphere.

2. Description of the Prior Art

Fine powder with magnetic properties has been applied to various fields, such as a contrast medium for a magnetic resonator, a recording medium for a magnetic tape, and a raw material for a magnetic fluid. Oxide based powders such as $Fe_2O_3$, $Fe_3O_4$, Fe-ferrite, Co-ferrite, etc have been commercially used as powders with magnetic properties.

Meanwhile, a pure iron powder has magnetization that is two or three times higher than the oxide-based powder, and has a relatively low anisotropy. Accordingly, a coercive force of the pure iron-based powder is lower than that of the oxide-based powder. Additionally, when a particle size of the pure iron powder is reduced to a single magnetic domain size, the magnetization of the pure iron-based powder is refined to a predetermined value, and the coercive force of the pure iron-based powder is simultaneously increased. Thus, it is possible to use the pure iron-based powder as a magnetic recording medium. Furthermore, when the particle size of the pure iron powder is further refined to a smaller size to act as a super-paramagnet, it can be used as a magnetic fluid.

Conventionally, a fine powder with magnetic properties has been most commonly produced according to a liquid phase reaction process, such as a metal hydroxide reduction process or a metal salt reduction process. Particularly, in the case of the high quality contrast medium and the magnetic fluid for a sealant, the particle sizes are the same as the single magnetic domain sizes or less, and thus, it can be produced using only raw powder having a super-paramagnetic property. Therefore, recently, there is an increased demand to develop a technology for producing fine powder which has lower particle size and improved magnetic properties.

To meet the above demand, Korean Pat. Application No. 2003-77589 has been filed by the applicant of the present invention, which discloses a method of producing a pure iron powder with a particle size of tens nm according to a gas condensing process. According to the above patent, an Fe-containing liquid precursor is gasified, Fe gas is separated from the gasified precursor, and the separated Fe gas is condensed to produce nano-sized Fe powder. However, an explosion may occur under atmospheric air in the course of collecting the Fe powder, after the Fe powder is produced according to the gas condensing process. Hence, in order to avoid such an explosion, it is necessary to enable the Fe powder to be subjected to a passivation treatment which forcibly feeds a small amount of oxygen into a chamber. An oxide layer is coated on a surface of the Fe powder, thereby resulting in safe treatment of the Fe powder under atmospheric air. However, the magnetic properties of an iron oxide layer coated on the surface of the Fe powder are very different from those of a pure iron core. Accordingly, it is difficult to gain the desired and intrinsic magnetic properties of the pure iron. Another disadvantage of the above patent is that when the Fe powder is used as the contrast medium, the iron oxide layer coated on the Fe powder is toxic to humans.

SUMMARY OF THE INVENTION

Therefore, the present invention, which is an improvement of Korean Pat. Application No. 2003-77589 having been submitted by the applicant of the present invention, has been made keeping in mind the above disadvantages occurring in the prior arts. An object of the present invention is to provide a method of producing a pure iron powder with a particle size of tens nm, in which nano-sized Fe powder produced according to a chemical gas condensing process is directly injected into a solution containing a polymer element. At this time, the pure iron powder has not an oxide layer but a polymer layer coated on its surface.

The above object can be accomplished by providing a method of producing a nano-sized Fe powder having a polymer coated layer on a surface thereof. The method includes gasifying an Fe-containing liquid precursor, injecting inert gas into the gasified Fe-containing precursor to separate nano-sized Fe particles from the gasified Fe-containing precursor, and injecting the separated nano-sized Fe particles into a polymer solution to produce the nano-sized Fe powder having the polymer coated layer.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a detailed description will be given of the present invention.

Figure 1:
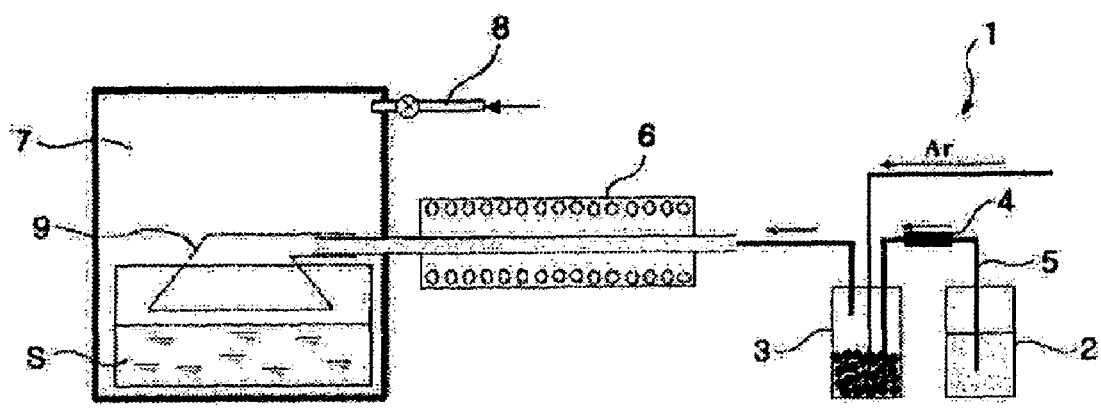
FIG. 1 schematically illustrates a chemical gas condensing plant according to the present invention.

With reference to FIG. 1, there is schematically illustrated a chemical gas condensing plant 1 according to the present invention. The plant 1 includes a ceramic bubbler 3, a reactor 6, and a chamber 7 as shown in FIG. 1.

An Fe-containing liquid precursor is gasified by the ceramic bubbler 3. In detail, the Fe-containing liquid precursor is fed from a storage tank 2 through a feeding pipe 5 and a feeder 4 into the ceramic bubbler 3. The liquid precursor is then gasified in the ceramic bubbler 3, which is maintained at a certain temperature.

Examples of the Fe-containing liquid precursor useful in the present invention include iron pentacarbonyl ($Fe(CO)_5$) and iron acetate ($(CH_3CO_2)_2Fe$). At this time, iron pentacarbonyl having a boiling point of about 103° C. is quickly gasified at 150-200° C.

However, the gas, which is gasified from the Fe-containing liquid precursor by the ceramic bubbler 3, is not decomposed into Fe and CO gas at 150-200° C. Accordingly, the gasified precursor is fed into the reactor 6, which is maintained at relatively high temperatures, by injecting an inert gas into the gasified precursor. In the reactor 6, Fe is separated from the gasified precursor, thereby producing nano-sized Fe powder. In this respect, a temperature of the reactor 6 ranges from 400-1000° C., and preferably 400-800° C. For example, when the temperature of the reactor 6 is higher than 1000° C., a nonmagnetic y-Fe phase as well as an a-Fe phase is formed in the nano-sized Fe powder. In this regard, it is preferable to suppress the formation of the nonmagnetic y-Fe phase because the y-Fe phase negatively affects physical properties of the nano-sized Fe powder.

Fe gas, separated from the gasified precursor which is fed in conjunction with the inert gas into the reactor 6, is injected into the chamber 7 to produce the Fe powder with a particle size of tens nm. At this time, a polymer solution (S) is charged in the chamber 7, and Fe particles injected from an injection pipe 9 of the reactor 6 sink in the polymer solution (S) in the chamber 7.

The polymer solution (S) serves to prevent the nano-sized Fe powder from being oxidized, and to control magnetic properties of the nano-sized Fe powder. In particular, a polymer coat is formed on a surface of the nano-sized Fe powder. The polymer solution (S) useful in the present invention may be any one selected from the group consisting of a thiol solution, a carboxylic acid solution, a sulfonic acid solution, and a phosphoric acid solution. In this respect, it is preferable to use the thiol solution, containing 0.03-0.3 mole hexadecanethiol ($CH_3(CH_2)_{15}SH$) and deoxygenated ethanol, as the polymer solution (S). After completely injecting the Fe gas into the polymer solution (S), the resulting polymer solution (S) is dried under a nitrogen atmosphere to accomplish the nano-sized Fe powder having the polymer coat.

Having generally described this invention, a further understanding can be obtained by reference to examples which are provided herein for the purposes of illustration only and are not intended to be limiting unless otherwise specified.

EXAMPLE 1

An Fe powder was produced using iron pentacarbonyl as an Fe-containing liquid precursor in a chemical gas condensing plant 1 as shown in FIG. 1. At this time, a temperature of a ceramic bubbler 3 of the chemical gas condensing plant 1 was maintained at 150-200° C., and the Fe-containing liquid precursor was fed into the ceramic bubbler 3 at a flow rate of 0.1-0.50 g/min. Additionally, Ar gas was fed into the ceramic bubbler 3 at a flow rate of 500-2000 cc/min to enable the gasified Fe-containing precursor to flow into a reactor 6. The gasified Fe-containing precursor passing through the reactor 6 was injected into a chamber 7 made of stainless steel. The reactor 6 was made of a highly pure alumina tube with an inner diameter of 5 mm and a length of 300 mm, and a temperature of the reactor 6 was maintained at 600° C.

In order to coat a polymer solution on particles of the nano-sized Fe powder produced by the reactor 6, 0.03-0.3 mole hexadecanethiol ($CH_3(CH_2)_{15}SH$) and deoxygenated ethanol were charged in the chamber 7. The Fe particles were injected into the polymer solution in the chamber 7, wherein the particles sunk in the polymer solution. After completely injecting the Fe particles into the polymer solution, the resulting polymer solution was dried under a nitrogen atmosphere to accomplish the nano-sized Fe powder having a polymer coat formed on a surface thereof.

Figure 2:
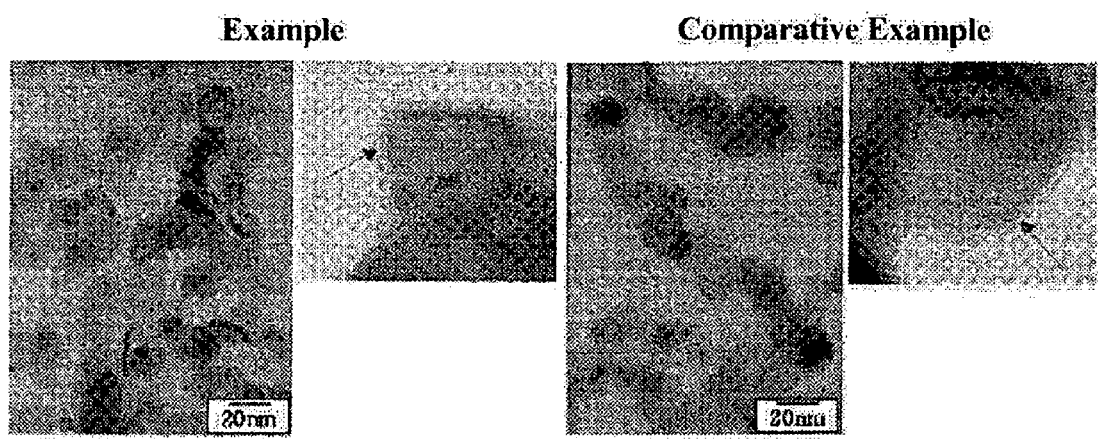
FIG. 2 illustrates electron microscope pictures of nano-sized Fe powders produced according to a conventional method and the present invention.

The nano-sized Fe powder having the polymer coat (example 1 of the present invention) was compared with another nano-sized Fe powder having no polymer layer (comparative example) using an electron microscope, and the results are shown in FIG. 2.

As shown in FIG. 2, the nano-sized Fe powders of example 1, according to the present invention, and the comparative example, had an average particle size of about 20 nm. Further, in the case of the comparative example, a single coated layer was formed on the Fe powder. In contrast, massive multi-layers are formed on the Fe powder in the case of example 1.

Figure 3:
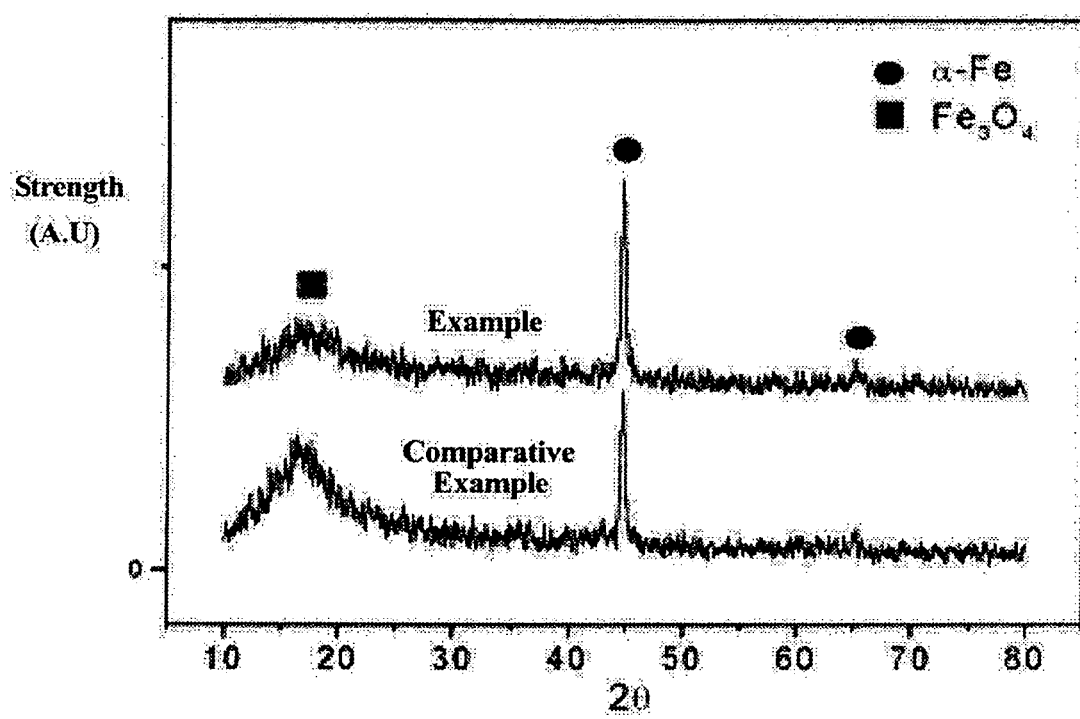
FIG. 3 illustrates X-ray diffraction patterns of the nano-sized Fe powders of FIG. 2.

FIG. 3 illustrates X-ray diffraction patterns of the nano-sized Fe powders of example 1 and the comparative example. As shown in FIG. 3, a relatively large iron oxide ($Fe_3O_4$) phase is formed on the Fe powder according to the comparative example. However, in the case of the Fe powder according to example 1, a relatively small amount of iron oxide exists on the Fe powder. In other words, it can be considered that the single coated layer on the Fe powder of the comparative example consists of the iron oxide ($Fe_3O_4$) phase, and the coated layer which is on the Fe powder of example 1 is the polymer coat comprised of C, H, and elements.

EXAMPLE 2

Figure 4A:
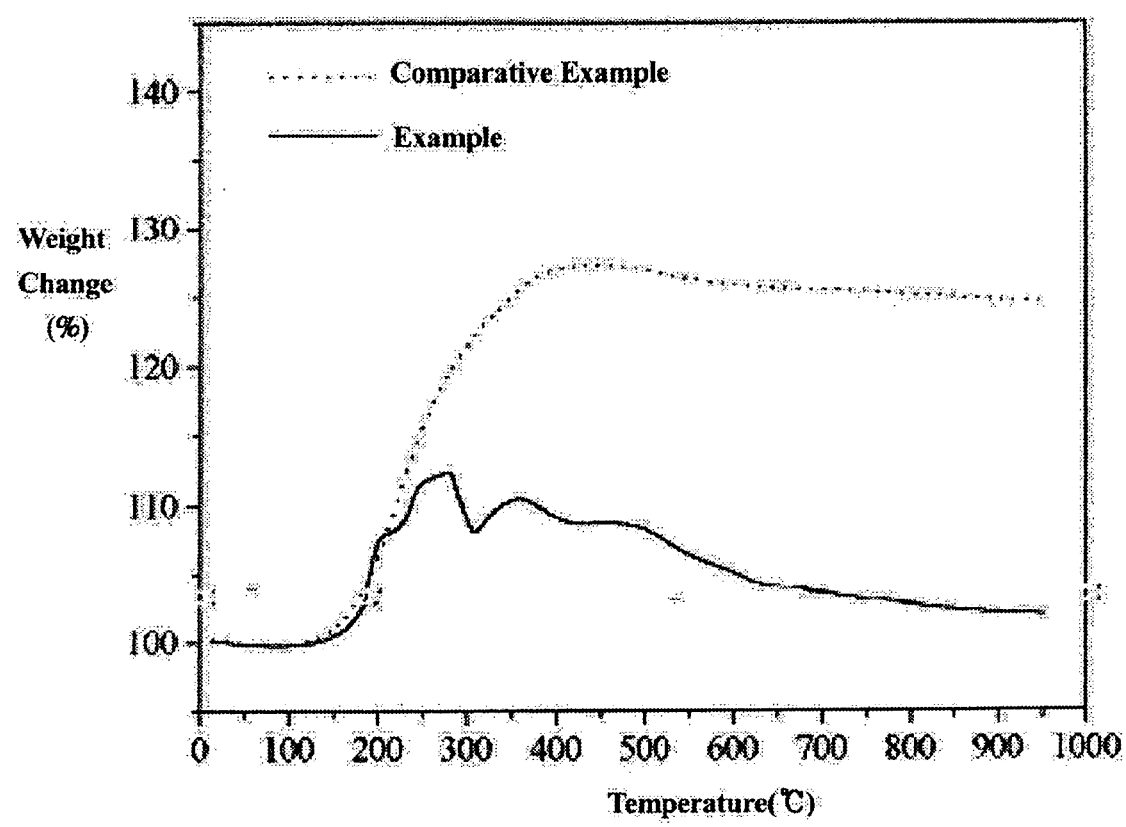
FIG. 4a is a graph showing a weight variation as a function of a temperature for the nano-sized Fe powders of FIG. 2.

To evaluate the suppression of the oxidation of the nano-sized Fe powder, produced according to example 1, by a polymer coat formed on the nano-sized Fe powder, a weight variation of the nano-sized Fe powder was observed while the nano-sized Fe powder was heated. The heating rate was 10° C./min from room temperature to 900° C. under atmospheric air, and then maintained at 900° C. FIG. 4a is a graph showing the weight variation as a function of a temperature for the nano-sized Fe powders of example 1 and a comparative example. At this time, the weight variation of each of the Fe powders was analyzed by a TGA analysis.

In the case of the comparative example, an Fe-core of the nano-sized Fe powder was increasingly oxidized according to an increase in the temperature of the Fe powder. The increased oxidation brought about an increase of the weight of the Fe powder to 125%, based on an initial weight of the Fe powder, as shown in FIG. 4a. In this respect this weight increase of the Fe powder corresponds to a weight difference between Fe and $Fe_3O_4$, when Fe is converted into $Fe_3O_4$.

However, in the case of the Fe powder according to example 1, even though a weight of the Fe powder fluctuates, which is to say decreases after it has rapidly increased at about 170° C., and then increases again, a total weight of the Fe powder is not largely increased. In other words, the weight increase of the Fe powder of example 1 at a relatively low temperature range of 170-300° C. is based on the fact that the weight increase of the Fe powder, due to the oxidation of the Fe powder, is smaller than a weight reduction of the Fe powder caused by the volatilization of the polymer coat from the Fe powder. The weight of the Fe powder fluctuates at 250-400° C., and the oxidation of the Fe powder is completed at 400° C. or higher. Additionally, the weight of the Fe powder is slowly reduced at 400° C. or higher because a small amount of polymer is further volatilized at 400° C. or higher.

Meanwhile, the weight variation of the Fe powder of example 1 was observed while the Fe powder was heat treated at 100-200° C., under atmospheric air for about six hours, so as to evaluate the thermal stability of the Fe powder of example 1. The results are shown in FIG. 4b.

Figure 4B:
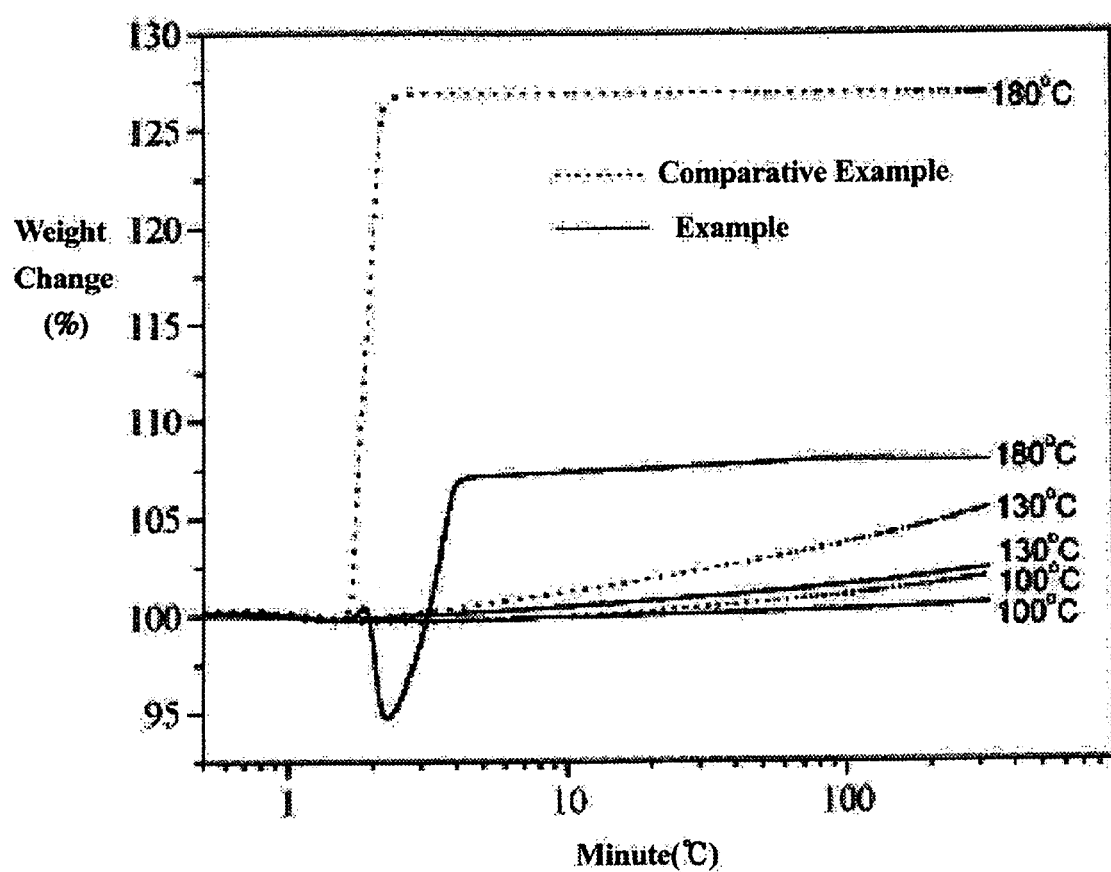
FIG. 4b is and a graph showing a weight variation as a function of a heat treatment time for the nano-sized Fe powders of FIG. 2, respectively.

As shown in FIG. 4b, when the Fe powder of example 1 was heat treated at 100-130° C., the weight increase of the Fe powder of example 1 was lower than that of the Fe powder of the comparative example by about ⅓. Further, a rate of the weight increase of the Fe powder according to example 1 was very low. Hence, it can be seen that the polymer coat formed on the Fe powder, at a temperature range of room temperature to 130° C., contributes to desirably reducing the oxidation of the Fe powder. Additionally, when the Fe powder of the comparative example is heat treated at 180° C., the weight of the Fe powder of the comparative example is rapidly increased to about 125%, and then constantly maintained while the temperature of the Fe powder increases further. However, in the case of the Fe powder of example 1, the weight of the Fe powder is rapidly reduced within minutes after a heat treating process of the Fe powder starts. This weight reduction is due to the volatilization of the polymer coat. Subsequently, the weight is then increased due to the oxidation of the Fe powder. The reason for this is that the polymer coat is thermally unstable at 180° C., and thus, it is easily destroyed and volatilized, leading to the oxidation of the Fe-core contained in the Fe powder.

From the results gained by the X-ray diffraction patterns and the TGA analysis, it can be seen that the polymer coat formed on the Fe powder according to example 1 effectively prevents the Fe powder from being oxidized. At this time, an anti-oxidizing ability of the polymer coat is available at a temperature range of room temperature to 130° C.

EXAMPLE 3

Magnetic properties, such as a coercive force and maximum magnetization, of nano-sized Fe powders produced according to example 1 and a comparative example were evaluated, and the results are described in the following Table 1.

TABLE 1

| [1]Core size | [2]$Fe_3O_4$ thickness | [3]Co. | C (wt %) | S (wt %) | O (wt %) | [4]Max. | |
|---|---|---|---|---|---|---|---|
| 17 | 3.4 | 998 | 0.42 | 0 | 13.6 | 147 | [5]Co. Ex. |
| 16 | 0.3 | 187 | 16.10 | 2.20 | 4.21 | 165 | [6]Ex. 1 |

[1]Core size: Fe-Core size (nm)
[2]$Fe_3O_4$ thickness: $Fe_3O_4$ Shell thickness (nm)
[3]Co.: coercive force (Oe)
[4]Max.: maximum magnetization (emu/g)
[5]Co. Ex.: comparative example
[6]Ex. 1: example 1

As shown in the Table 1, the Fe powders according to the comparative example and example 1 have virtually the same particle size of about 17 nm. This is because the particle size of the Fe powder largely depends on a reaction temperature of a reactor. Further, a thickness of an oxide layer, gained by calculating a concentration of oxygen, is about 3.4 nm and 0.3 nm for the Fe powders according to the comparative example and example 1, respectively. In the case of the Fe powder of example 1, a large amount of carbon and sulfur were detected, which are main components constituting a polymer coat formed on the Fe powder of example 1.

In addition, the maximum magnetization of the Fe powder according to example 1 is slightly higher than that of the Fe powder according to the comparative example. Further, the Fe powder of example 1 has a very lower coercive force compared to the Fe powder of the comparative example. The reason may be that a volume rate per unit mass of a pure iron in the Fe powder of the example 1 is increased. The coercive force of the Fe powder of the comparative example is increased because of a relatively high magnetic anisotropy of iron oxide in the Fe powder, and a relatively high exchange anisotropy between an Fe-core and the iron oxide.

As apparent from the above description, the present invention provides a method of producing nano-sized Fe powder having a polymer coat formed on its surface. A particle size, a phase area, and magnetic properties of the nano-sized Fe powder can be controlled by adjusting a reaction temperature in a chemical gas condensing process, and the oxidation of the nano-sized Fe powder is prevented under atmospheric air. Therefore, the method according to the present invention can be applied to various fields, such as a magnetic recording medium, a magnetic fluid, and a biomedical field.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A system of producing nano-sized Fe powder having a polymer coated layer on a surface thereof, comprising:
    a means for gasifying an Fe-containing liquid precursor;
    a means for separating nano-sized Fe-particles from the gasified Fe-containing precursor to present Fe as an outermost layer; and
    a means for injecting the separated nano-sized Fe particles into a polymer solution to produce the nano-sized Fe powder having a polymer coated layer.

2. The system of claim 1, wherein the gasifying means is a ceramic bubbler in fluid communication with a storage tank, and further wherein the liquid precursor passes from the storage tank, through a feeder, and into the ceramic bubbler which is maintained at a predetermined temperature.

3. The system of claim 1, wherein the separating means includes a reactor for receiving the gasified precursor and an inert gas, and further wherein Fe is separated from the gasified precursor in the reactor.

4. The system of claim 1 further comprising a chamber wherein the separated nano-sized Fe particles are injected into the polymer solution.

5. The system of claim 1, wherein the Fe-containing liquid precursor includes iron pentacarbonyl ($Fe(CO)_5$) or iron acetate ($(CH_3CO_2)_2Fe$).

6. The system of claim 1, wherein the polymer solution is any one selected from the group consisting of a thiol solution, a carboxylic acid solution, a sulfonic acid solution, and a phosphoric acid solution.

7. The system of claim 6, wherein the polymer solution is a thiol solution containing 0.03 to 0.30 mole hexadecanethiol ($CH_3(CH_2)_{15}SH$) and deoxygenated ethanol.

8. An apparatus for producing nano-sized Fe powder having a polymer coated layer on a surface thereof, the apparatus comprising:
    a ceramic bubbler for gasifying an Fe-containing liquid precursor;
    a reactor for separating Fe from the gasified precursor to present separated nano-sized particles having Fe as an outermost layer; and
    a chamber wherein the separated nano-sized Fe particles are directed injected into a polymer solution, and wherein said nano-sized Fe particles sink in the polymer solution int eh chamber, and the particles are coated with a layer of the polymer.

9. The apparatus of claim 8, wherein the Fe-containing liquid precursor includes iron pentacarbonyl ($Fe(CO)_5$) or iron acetate (($CH_3CO_2)_2Fe$).

10. The apparatus of claim 8, wherein the gasified Fe-containing precursor is decomposed at 400-800° C. to separate the nano-sized Fe particles from the gasified Fe-containing precursor.

11. The apparatus of claim 8, wherein the ceramic bubbler is in fluid communication with a storage tank, and further wherein the liquid precursor passes from the storage tank, through a feeder, and into the ceramic bubbler which is maintained at a predetermined temperature.

12. The apparatus of claim 8, wherein the polymer solution is any one selected from the group consisting of a thiol solution, a carboxylic acid solution, a sulfonic acid solution, and a phosphoric acid solution.

13. The apparatus of claim 12 wherein the polymer solution is a thiol solution containing 0.03 to 0.30 mole hexadecanethiol ($CH_3(CH_2)_{15}SH$) and deoxygenated ethanol.

* * * * *

UNITED STATES PATENT AND TRADEMARK OFFICE
CERTIFICATE OF CORRECTION

| | | |
|---|---|---|
| PATENT NO. | : 7,396,502 B2 | Page 1 of 1 |
| APPLICATION NO. | : 10/980940 | |
| DATED | : July 8, 2008 | |
| INVENTOR(S) | : Byung Kee Kim, Dong Won Lee and Chul-Jin Choi | |

It is certified that error appears in the above-identified patent and that said Letters Patent is hereby corrected as shown below:

Column 4, line 22, "C, H and elements" should read --C, H and S elements--;
Column 6, line 66, claim 8 "solution int eh chamber" should read --solution in the chamber--

Signed and Sealed this

Seventeenth Day of February, 2009

JOHN DOLL
*Acting Director of the United States Patent and Trademark Office*